Oct. 4, 1927.  1,644,564
F. A. BULLINGTON
SEALING MEANS FOR ROTARY ENGINES
Filed June 2, 1923    2 Sheets-Sheet 1

INVENTOR
Frank A. Bullington
BY
ATTORNEY

Oct. 4, 1927.  F. A. BULLINGTON  1,644,564
SEALING MEANS FOR ROTARY ENGINES
Filed June 2, 1923   2 Sheets-Sheet 2
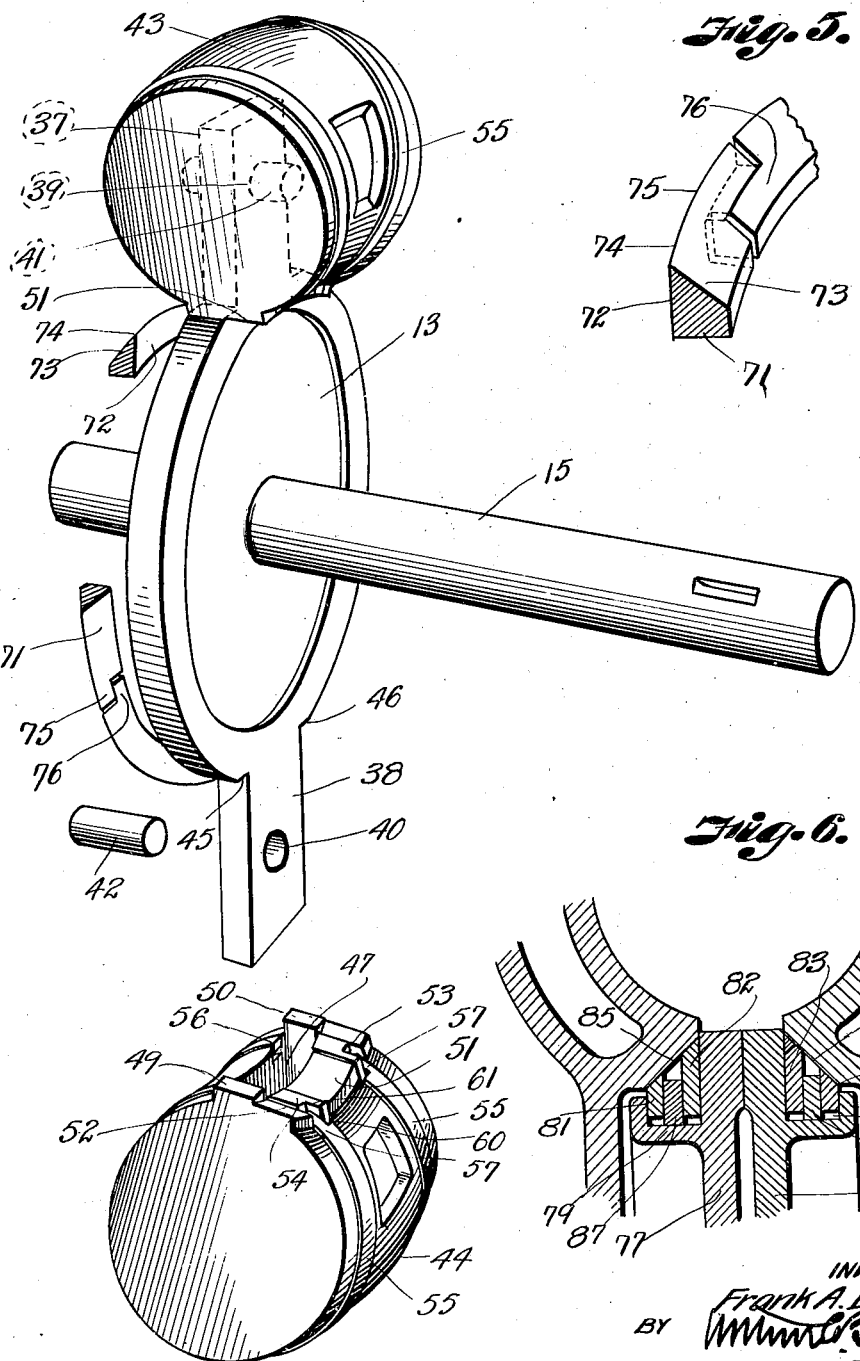
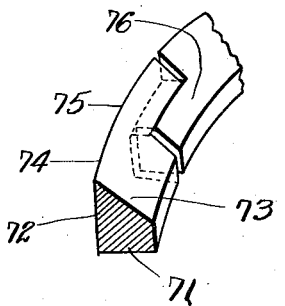
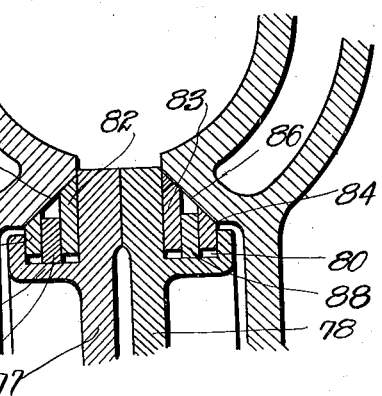
INVENTOR
Frank A. Bullington
BY
ATTORNEY Patented Oct. 4, 1927.

1,644,564

UNITED STATES PATENT OFFICE.

FRANK A. BULLINGTON, OF KANSAS CITY, MISSOURI, ASSIGNOR TO BULLINGTON MOTORS, OF KANSAS CITY, MISSOURI, A COMMON-LAW TRUST CONSISTING OF SOLOMON STODDARD, ERNEST E. HOWARD, AND FRANK A. BULLINGTON.

SEALING MEANS FOR ROTARY ENGINES.

Application filed June 2, 1923. Serial No. 643,097.

This invention relates to prime movers for generating power and particularly to a motor in which the expansible motive fluid is employed to impart motion to pistons which rotate about a common axis.

In its generic aspects the invention is applicable to various types of so-called rotary engines and particularly is this true with respect to the sealing means for the pistons, the piston rotors and the piston casing.

The invention is particularly applicable to engines of the general type disclosed in my application Serial No. 567,288, filed June 10, 1922 and since the general piston controlling means may vary, I will not specifically describe any particular mechanism in this application. This description will be confined more particularly to the sealing means, the parts to be sealed being referred to only in a generic way.

The novelty of the invention will be apparent by reference to the following description in connection with the accompanying drawings, in which Fig. 1 is a longitudinal, sectional view through the engine mechanism, showing the invention applied.

Fig. 4 is an enlarged, perspective view of one of the rotors and one piston, one rotor sealing ring being shown in perspective with parts being broken away and the pin for securing the piston to the rotor being shown in perspective, the complementary piston being shown detached.

Fig. 5 is a detail view of the lap joint for one of the rotor sealing rings, and Fig. 6 is a cross sectional view through a slightly modified form of rotor sealing means.

Figure 1:
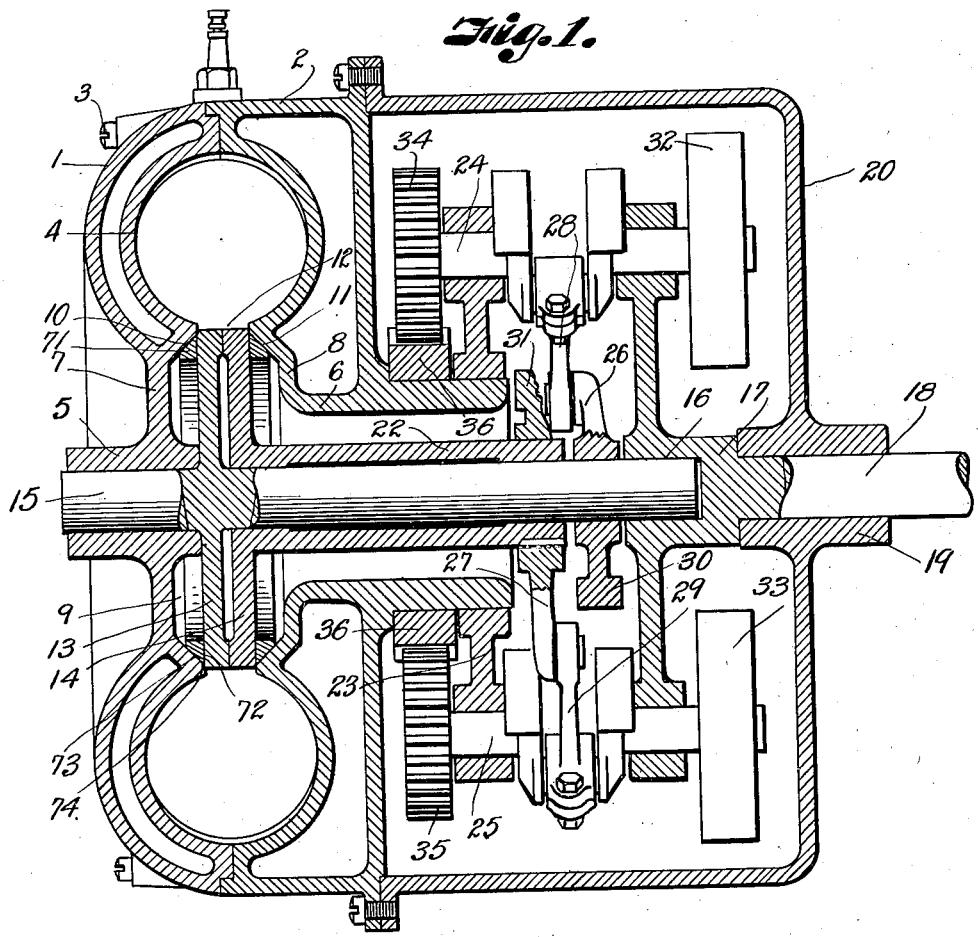

The stator is shown as consisting of two members 1 and 2 which may be fastened together by suitable means, for example, bolts 3, to provide a circumferential cylinder or piston chamber 4. The members 1 and 2 are connected to their respective hubs or bearing portions 5 and 6 by webs 7 and 8 spaced apart to provide a rotor chamber 9. The rotor chamber 9 is provided with inclined walls 10 and 11 adjacent to the passage way 12 connecting the rotor chamber 9 with the cylinder 4. The inclined walls have an important bearing on the question of sealing, as will be apparent hereinafter.

The rotors 13 and 14 are, of course, independently movable. The rotor 13 is preferably integral with its shaft 15 mounted in the hub 5 and in the recess 16 in the crank carrier 17 on the end of the power delivery shaft 18, mounted in a bearing 19 in the casing 20. The rotor 14 has a hollow shaft 22 mounted on the shaft 15, as clearly seen in Fig. 1.

The pistons are, of course, carried by the rotors, and they are operated through suitable mechanism. For example, complementary to the crank carrier 17 is a co-operating crank carrier bearing member 23 mounted on the hub 6. The members 17 and 23 carry single throw cranks 24 and 25 which are connected to the crank arms 26 and 27 on the shafts 15 and 22 by links 28 and 29. The crank arms 26 and 27 have counter-balance weights 30 and 31 at points distant from the connection to the links.

The shafts 24 and 25 carry fly wheels 32 and 33 at their outer ends and gears 34 and 35 at their inner ends. The gears 34 and 35 mesh with a fixed gear 36 on the hub portion 6 so that they will planetate about the axis of the fixed gear and through the mechanism just described, power will be communicated to the power transmission shaft 18.

The particular operation and description of the connecting link between the shafts 15 and 22 and the shaft 18 will not be specifically described here because specifically, it forms no part of the present invention. Suffice it to say that the general operation corresponds to that described in my application Serial No. 567,288, filed June 10, 1922, although the mechanism shown in this case specifically is different and it has certain advantages over the construction shown in said application. The particular linkage mechanism, however, will form the subject matter of another application.

The two rotors 13 and 14 are substantially counterparts one of the other so I will only describe specifically one of them. Each rotor has two diametrically opposite projections 37 and 38 with openings 39 and 40, through which pins 41 and 42 may pass to secure the pistons, for example, 43 and 44, to the rotors. The rotors are annular and at the base of the projections 37 and 38 they are provided with flat shoulders as at 45 and 46 (Fig. 4). The hollow pistons are provided with slots as at 47 in piston 44, Fig. 4, into which the projections 37 and 38 extend. The slots are provided with walls 48 through which the pins 41 and 42 extend to secure the pistons to the projections 37 and 38. The pistons are provided with projections 49 and 50, which rest upon the shoulders 45 and 46 to provide a firm setting or bearing for the pistons. The slot portions 47, of course, are offset with respect to the axial center of the pistons, the offset portions 51 of the pistons overlaps the complementary rotor; for example, the portion 51 in Fig. 4 will overlap the periphery of the complementary rotor 14 and similar pistons on rotor 14 will overlap upon the periphery of rotor 13.

Figure 3:
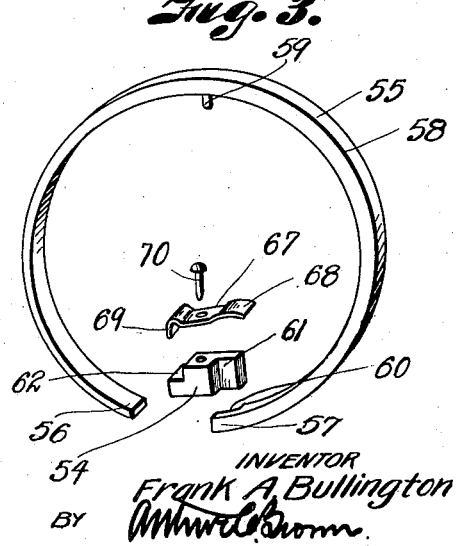
Fig. 3 is a disassociated view of the piston sealing means and rotor sealing bridge block.

The overlapping portions 51 of the piston are provided with recesses 52 and 53 to receive the bridge blocks 54 for the packing rings 55, there being preferably two packing rings for each piston. The packing rings 55 are split rings with spaced ends 56 and 57, each ring being over-weighted on one side, as at 58 (see Fig. 3); that is, the ring on one side of the pin 59 is thicker and, therefore, of greater weight than the portion of the ring on the other side of the pin 59. Centrifugal force will cause the portion having the end 56 to creep or move against its projection 37 or 38 while the end 57 will have a tendency to pull away from its bridging block 54, but the end 57 is provided with an offset 60 overlapping the shouldered portion 61 on the bridge block 54, and the bridge block is provided with a shouldered portion 62, which bears against the projection 37, for example, irrespective of any movement of the end 57. Movement of the ring 55, when the piston is removed, will be limited, however, by the pin 59, which is in the recess or pocket 59' in the piston.

The ring may have an inherent expansive tendency, but the tendency to expand will be augmented by expansion springs 63 and 64 in recesses 65 and 66 in the piston, so the ring end portions will always be maintained in contact against the cylinder, the springs being also effective in overcoming the centrifugal force, which would tend to move the ring ends radially outward close to the piston and away from the cylinder wall.

The bridge block carries a retainer spring 67 which is a flat spring having a lip 68 overlapping but out of contact with the end 57 and a depending lip portion 69 which overlaps the shouldered portion 62. The spring 67 is secured to the block 54 by a pin or other suitable fastening device 70. Therefore, when the piston is removed from its projection, either 37 or 38, the ring 55 and the bridge block will be retained as a part of the piston. Liability of the block 54 being displaced upon removal of the piston will, therefore, be prevented. In addition to its function as a retainer for the block 54, the spring 67 serves to maintain the block in sealing contact with the peripheral surface of the complementary rotor. The resilient thrust pressure of the spring 67 is made sufficient to exceed centrifugal force effective on the block 54 when rotated about the axis of the engine.

It will be observed, of course, that the bridge block will co-operate with the piston ring in forming an efficient seal between the cylinder and piston and between the complementary rotor and piston so that leakage will be prevented.

Figure 2:
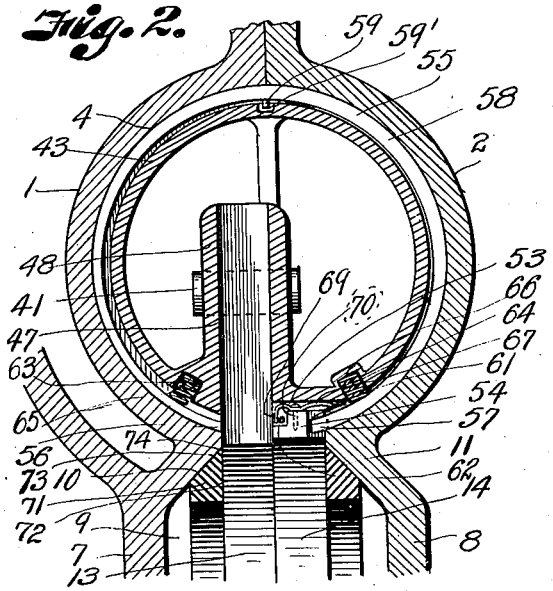
Fig. 2 is a cross sectional view through the piston cylinder and through one of the pistons.

I have provided an efficient means for sealing the cylinders 4 and the rotor chamber 9. This means consists of one or more rings 71. Each ring has a flat face 72 bearing against the side face of its rotor and an inclined face 73 bearing against the inclined wall 10 or 11 of the rotor chamber. The ring has an acute angle 75 which fits into the acute angular space of the rotor chamber formed by the wall 10 or the wall 11 and the side of the rotor, as will be clearly seen by reference to Figs. 1, 2, and 4. The rings have an inherent expansive tendency and their ends overlap, as at 75 and 76, so that leakage at the split portions will be prevented. The inherent tendency of the rings to expand will exert pressure against the walls 10 and 11 by the walls 73 which will re-act enough to cause the rings to also bear against the rotors so that the rotors will be forced together and since the piston rings prevent leakage between the rotors and the rings 72 prevent leakage between the cylinder and the rotor casing, it is apparent that a very simple, effective sealing means is provided.

In Fig. 6 I have shown a slightly modified form of sealing means in which the rotors 77 and 78, corresponding in a generic sense to the rotors 13 and 14, have grooved offset rings 79 and 80, in which are packing rings 81 and 82 on one side and 83 and 84 on the other. The rings 81, 82, 83, and 84 all have inclined faces which bear against inclined faces 85 and 86 on the rotor chamber casing, and they alternate with rings 87 and 88 in the offset portions 79 and 80.

It will be seen that in the form shown in Fig. 6, substantially the same actions and re-actions take place because the rings 81, 82, 83, and 84 all have inclined faces corresponding to the inclined face 73 of the ring 72, and they also exert force against the rotors 77 and 78 in substantially the same manner although in Fig. 6, the construction is such that labyrinth packing or sealing means is provided. The function of the sealing means in Fig. 6 will be perfectly clear by reference to the drawings.

It will be apparent from the foregoing that I have provided a simple, efficient form of sealing, both for the piston and the cylinder. This is of vital importance to a rotary engine because, obviously, it is immaterial how well balanced the piston rotors and pistons are, or the linkage mechanism; if the sealing means fails, the engine becomes inefficient and, of course, a sealing means to be practical must be one which will perform satisfactorily over long periods. Therefore, I have simplified the construction of the sealing means to guard against leakage at any point and at the same time make a sealing means which will be rugged enough to withstand the ordinary operating conditions to which it will be subjected.

What I claim and desire to secure by Letters-Patent is:

1. A piston ring for rotary engines comprising, in combination with an annular cylinder, a piston in the cylinder and a rotor having an extension carrying the piston, a sealing ring carried by the piston and having spaced ends located at opposite sides of the rotor extension, the portion of the ring at one side of the piston being of greater mass than at the opposite side whereby centrifugal force generated during operation of the engine effects movement of the ring in a direction to effect contact of the end of the ring at the side of lesser weight with the extension.

2. A piston ring for rotory engines comprising, in combination with an annular cylinder, a piston in the cylinder and a rotor having an extension carrying the piston, a sealing ring carried by the piston and having spaced ends located at opposite sides of the rotor extension, the portion of the ring at one side of the piston being of greater mass than at the opposite side whereby centrifugal force generated during operation of the engine effects movement of the ring in a direction to effect contact of the end of the ring at the side of lesser weight with the extension, a sealing member at that end of the ring having greater mass, the end of the block and the end of the ring having stepped, overlapping relationship to maintain sealing contact and compensate for wear.

3. A piston ring for rotary engines comprising, in combination with an annular cylinder and complementary rotors, a piston in the cylinder, an extension on one of the rotors carrying the piston, a ring on the piston having spaced ends, a rotor sealing means at one end of the ring of lesser length than the space between the ends of the ring, the remainder of said space being occupied by the rotor extension.

4. A piston ring for rotary engines comprising, in combination with an annular cylinder and complementary rotors, a piston in the cylinder, an extension on one of the rotors carrying the piston, a ring on the piston having spaced ends, a rotor sealing means at one end of the ring of lesser length than the space between the ends of the ring, the remainder of said space being occupied by the rotor extension, the rotor sealing means and the adjacent end of the ring having stepped, overlapped relation.

5. A piston ring for rotary engines comprising, in combination with an annular cylinder and complementary rotors, a piston in the cylinder, an extension on one of the rotors carrying the piston, a ring on the piston having spaced ends, a rotor sealing means at one end of the ring of lesser length than the space between the ends of the ring, the remainder of said space being occupied by the rotor extension, and resilient means interposed between said rotor sealing means and the piston to offset the effect of centrifugal force tending to unseat the sealing means.

6. A piston ring for rotary engines comprising, in combination with an annular cylinder and complementary rotors, a piston in the cylinder, an extension on one of the rotors carrying the piston, a ring on the piston having spaced ends, a rotor sealing means at one end of the ring of lesser length than the space between the ends of the ring, the remainder of said space being occupied by the rotor extension, the rotor sealing means and the adjacent end of the ring having stepped, overlapped relation, and resilient means interposed between said rotor sealing means and the piston to offset the effect of centrifugal force tending to unseat the sealing means.

7. A piston ring for rotary engines comprising, in combination with an annular cylinder, a piston in said cylinder, a rotor having an extension carrying the piston, a split ring for the piston having its ends at opposite sides of the extension, and springs on said piston at opposite sides of the rotor extension yieldingly urging the ends of the ring to resist centrifugal force.

8. A piston ring for rotary engines comprising, in combination with an annular cylinder, a piston in said cylinder, a rotor having an extension carrying the piston, a split ring for the piston having its ends at opposite sides of the extension, rotor sealing means between the ends of the springs, and springs on said piston at opposite sides of the rotor extension yieldingly urging the ends of the ring to resist centrifugal force.

In testimony whereof I affix my signature.

FRANK A. BULLINGTON.